United States Patent
Izawa et al.

(10) Patent No.: US 7,406,371 B2
(45) Date of Patent: Jul. 29, 2008

(54) SUSPENSION CONTROL SYSTEM

(75) Inventors: Masaki Izawa, Saitama (JP); Takafumi Kato, Saitama (JP); Shigenobu Sekiya, Saitama (JP); Yoshio Onoe, Saitama (JP); Tsukasa Fukuzato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 525 days.

(21) Appl. No.: 11/197,541

(22) Filed: Aug. 5, 2005

(65) Prior Publication Data

US 2006/0047387 A1    Mar. 2, 2006

(30) Foreign Application Priority Data

Aug. 6, 2004 (JP) ............................ 2004-230206
Aug. 6, 2004 (JP) ............................ 2004-230207

(51) Int. Cl.
    *G60G 17/18* (2006.01)
(52) U.S. Cl. ............................ 701/37; 701/38; 280/5.5; 280/5.515; 280/5.512
(58) Field of Classification Search ............. 701/36–38; 73/11.04, 11.07; 280/5.5, 5.507, 5.512, 5.515
    See application file for complete search history.

(56) References Cited

U.S. PATENT DOCUMENTS

| | | | |
|---|---|---|---|
| 6,115,658 A * | 9/2000 | Ahmadian et al. | ............ 701/37 |
| 6,922,617 B2 * | 7/2005 | Kogure et al. | .................. 701/1 |
| 2003/0033063 A1 | 2/2003 | Bellicardi et al. | |

FOREIGN PATENT DOCUMENTS

| | | |
|---|---|---|
| EP | 0 326 180 A | 8/1989 |
| JP | 61036009 | 2/1986 |
| JP | 62-125908 A | 6/1987 |
| JP | 4-45368 B2 | 7/1992 |
| JP | 6-55920 A | 3/1994 |
| JP | 11-180125 A | 7/1999 |
| JP | 2000-52736 A | 2/2000 |
| JP | 2000-148208 | 5/2000 |
| JP | 2001-1736 A | 1/2001 |
| JP | 2002-211224 | 7/2002 |

* cited by examiner

*Primary Examiner*—Yonel Beaulieu
(74) *Attorney, Agent, or Firm*—Arent Fox LLP.

(57) ABSTRACT

In a suspension control system, accelerations detected by acceleration sensors are differentiated by a differentiator to calculate acceleration derivative values. Based on these values, a target electrical current calculating section calculates a target electrical current that is supplied to an actuator which controls a damping force of a damper. Before a rolling or pitch angle occurs in the vehicle, the change of the rolling or pitch angle is predicted to control the damping force of the damper, thereby improving the response of rolling angle and pitch angle control to achieve, simultaneously, an accurate posture control and a satisfactory riding comfort. Because the target electrical current calculating section corrects the target electrical current of the actuator based on a damper speed obtained by differentiating a damper displacement, even when a large input is applied to the damper due to an unevenness of the road surface, a proper posture control is performed.

10 Claims, 11 Drawing Sheets

SUSPENSION CONTROL SYSTEM

RELATED APPLICATION DATA

The present invention is based upon Japanese priority application Nos. 2004-230206 and 2004-230207, which are hereby incorporated in their entirety herein by reference.

BACKGROUND OF THE INVENTION

1. Field of the Invention

The present invention relates to a suspension control system for a suspension which suspends a wheel of a vehicle, wherein the suspension includes a damper having an actuator for changing a damping force of the damper.

2. Description of the Related Art

Japanese Patent Application Laid-open No. 2002-211224 discloses a suspension control method wherein the spring rate of a coil spring used by a suspension is changed by an actuator-generated torque according to the steering angle speed of a steering wheel and the rolling angle of a vehicle. Accordingly, any increase in the rolling angle due to the vehicle turning is suppressed, thereby improving running stability.

However, in the method described in Japanese Patent Application Laid-open No. 2002-211224, the rolling angle of the vehicle is detected from an output of a displacement sensor disposed in the suspension, and the actuator is controlled wherein the detected rolling angle is identical to a predetermined target value. That is, the actuator is controlled to suppress the rolling after an actual rolling of the vehicle occurs. As such, the control response is delayed, which results in a deterioration of riding comfort during control of the rolling angle.

Also, Japanese Patent Application Laid-open No. 2000-148208 discloses a suspension control system in which the control is switched between a riding comfort control and a posture control by, for example, monitoring a steering angle signal. During riding comfort control, the damping force of a damper is controlled to suppress vibrations transmitted from a road surface to the vehicle body via a suspension. During posture control, the damping force of a damper is controlled to improve running stability by suppressing the change of a rolling angle resulting from the turning of the vehicle or suppressing the change of a pitch angle resulting from the acceleration and deceleration of the vehicle.

However, in the system described in Japanese Patent Application Laid-open No. 2000-148208, the riding comfort control for improving riding comfort of the vehicle and the posture control for improving running stability of the vehicle are selectively performed based on the driving condition of the vehicle. Accordingly, the damping force of the damper suddenly changes during the control switch-over, thereby resulting in a rough or not-smooth driving experience for the driver which can be rather uncomfortable.

SUMMARY OF THE INVENTION

The present invention has been achieved in view of the above-mentioned circumstances, and, according to one aspect of the invention, improves riding comfort by improving the control response of an actuator when the damping force of a damper is changed by the actuator to control a rolling angle or a pitch angle of a vehicle.

Also, according to another aspect of the invention, the uncomfortable feeling experienced by the driver during the control switch-over, when selectively performing a riding comfort control and a posture control, is eliminated by changing the damping force of a damper by an actuator.

In order to achieve the first aspect, according to a first feature of the invention, there is provided a suspension control system which includes an actuator that changes a damping force of a damper used by a suspension wherein the suspension suspends a wheel on a vehicle body. An acceleration sensor detects a lateral acceleration or a longitudinal acceleration of a vehicle. An acceleration derivative value calculating means differentiates the acceleration detected by the acceleration sensor to calculate an acceleration derivative value. A target electrical current calculating means calculates, based on the acceleration derivative value, a target electrical current to be supplied to the actuator. A damper displacement sensor detects a damper displacement. A damper speed calculating means calculates a damper speed based on the damper displacement detected by the damper displacement sensor, wherein the target electrical current calculating means corrects the target electrical current based on the damper speed.

With the above configuration, the lateral or longitudinal acceleration of the vehicle, detected by the acceleration sensor, is differentiated by the acceleration derivative value calculating means to calculate the acceleration derivative value. Based on the acceleration derivative value, the target electrical current calculating means calculates the target electrical current to be supplied to the actuator which controls the damping force of the damper. Consequently, before a rolling or pitch angle actually occurs in the vehicle, the change of the rolling or pitch angle can be predicted to control the damping force of the damper, thereby improving the response of the rolling or pitch angle control to achieve, simultaneously, an accurate posture control and a satisfactory or comfortable riding experience for the driver. Additionally, the target electrical current calculating means corrects the target electrical current of the actuator based on the damper speed calculated from the damper displacement. Consequently, even when a large input is applied to the damper due to unevenness of the road surface, a proper posture control is performed without deteriorating or reducing riding comfort.

In order to achieve the first aspect, according to a second feature of the invention, there is provided a suspension control system which includes an actuator that changes a damping force of a damper used by a suspension, wherein the suspension suspends a wheel on a vehicle body. An acceleration sensor detects a lateral or longitudinal acceleration of a vehicle. An acceleration derivative value calculating means differentiates the acceleration detected by the acceleration sensor to calculate an acceleration derivative value. A target load calculating means calculates, based on the acceleration derivative value, a target load to be generated by the actuator. A target electrical current calculating means calculates, based on the target load, a target electrical current to be supplied to the actuator. A load sensor, disposed between the damper and the vehicle body, detects an actual load input from the damper to the vehicle body, wherein the target electrical current calculating means sets the target electrical current to be supplied to the actuator so that the actual load detected by the load sensor is identical to the target load.

With the above configuration, the lateral or longitudinal acceleration, detected by the acceleration sensor, is differentiated by the acceleration derivative value calculating means to calculate the acceleration derivative value. Based on the acceleration derivative value, the target load calculating means calculates the target load generated in the actuator, and the target electrical current calculating means sets the target electrical current that is supplied to the actuator so that the actual load detected by the load sensor is identical to the target load. Accordingly, before a rolling or pitch angle actually occurs in the vehicle, it is possible to predict the change of the rolling or pitch angle to control the damping force of the damper, thus improving the response of the rolling or pitch angle control to achieve, simultaneously, an accurate posture control and a satisfactory riding comfort. Additionally, even when a large input is applied to the damper due to unevenness of the road surface, the increase of the actual load reduces the target electrical current to lower the damping force of the damper, thus performing a proper posture control without deteriorating the riding comfort performance.

It is noted that, in the first and second features of the present invention, a lateral acceleration sensor and a longitudinal acceleration sensor of an embodiment correspond to the acceleration sensor of the present invention; differentiating means of the embodiment corresponds to the damper speed calculating means of the present invention; differentiating means of the embodiment corresponds to the acceleration derivative value calculating means of the present invention; and a target electrical current calculating section of the embodiment corresponds to the target electrical current calculating means of the present invention.

In order to achieve the second aspect, according to a third feature of the invention, there is provided a suspension control system which includes an actuator that changes a damping force of a damper of a suspension, wherein the suspension suspends a wheel on a vehicle body. A posture control portion calculates a parameter for controlling a posture of a vehicle, including roll or pitch. A riding comfort control portion calculates a parameter for suppressing vibration transmitted from a road surface to control the riding comfort of a vehicle. A high select portion outputs the larger one of the parameters calculated by the posture control portion and the parameter calculated by the riding comfort control portion to control the damping force of the damper.

With the above configuration, the posture control portion calculates the parameter for controlling the posture of the vehicle, including roll or pitch; the riding comfort control portion calculates the parameter for suppressing the vibration transmitted from the road surface to control the riding comfort of the vehicle; and the high select portion then outputs the larger one of the two parameters to control the damping force of the damper of the suspension. Accordingly, at the time of the switch-over between the posture control and the riding comfort control, the damping force of the damper is prevented from suddenly changing, thereby maintaining a smooth and comfortable driving experience for the driver.

In order to achieve the second aspect, according to a fourth feature of the invention, there is provided a suspension control system which includes an actuator that changes a damping force of a damper used by a suspension, wherein the suspension suspends a wheel on a vehicle body. A posture control portion calculates a parameter for controlling a posture of a vehicle, including roll or pitch. A riding comfort control portion calculates a parameter for suppressing a vibration transmitted from a road surface to control the riding comfort of a vehicle. An addition portion adds the parameter calculated by the posture control portion and the parameter calculated by the riding comfort control portion to control the damping force of the damper.

With the above configuration, the posture control portion calculates the parameter for controlling the posture of the vehicle, including roll or pitch; the riding comfort control portion calculates the parameter for suppressing the vibration transmitted from the road surface to control the riding comfort of the vehicle; and the addition portion then adds the two parameters to control the damping force of the damper of the suspension. Accordingly, the sudden change of the damping force of the damper due to the switch-over between the posture control and the riding comfort control is avoided, which eliminates any driving discomfort experienced by the driver and maintains a smooth and comfortable drive.

In order to achieve the second aspect, according to a fifth or sixth feature of the invention, in addition to the third or fourth feature, the posture control portion is a roll posture control section which calculates, based on at least a lateral acceleration derivative value, the parameter for controlling the posture of the vehicle; and the riding comfort control portion is a sky hook riding comfort control section which calculates, based on at least an above-spring vertical speed, the parameter for controlling the riding comfort of the vehicle.

With the above configuration, the posture control portion constitutes the roll posture control section which calculates the parameter for controlling the posture of the vehicle based on the lateral acceleration derivative value, and the riding comfort control portion constitutes the sky hook riding comfort control section which calculates the parameter for controlling the riding comfort of the vehicle based on the above-spring vertical speed. Accordingly, the posture control and the riding comfort of the vehicle are simultaneously implemented.

In order to achieve the second aspect, according to a seventh or eighth feature of the invention, in addition to the third or fourth feature, the posture control portion is a pitch posture control section, which calculates, based on at least a longitudinal acceleration derivative value, the parameter for controlling the posture of the vehicle; and the riding comfort control portion is a sky hook riding comfort control section, which calculates, based on at least an above-spring vertical speed, the parameter for controlling the riding comfort of the vehicle.

With the above configuration, the posture control portion constitutes the pitch posture control section which calculates the parameter for controlling the posture of the vehicle based on the longitudinal acceleration derivative value, and the ride quality control portion constitutes the sky hook ride quality control section, which calculates the parameter for controlling the ride quality of the vehicle based on the above-spring vertical speed. Accordingly, the posture control and the ride quality of the vehicle are simultaneously implemented.

In order to achieve the second aspect, according to a ninth feature of the invention, in addition to the fourth feature, the addition portion applies weights to the parameter calculated by the posture control portion and the parameter calculated by the ride quality control portion according to the vehicle speed before adding the two parameters.

With the above configuration, when the parameter calculated by the posture control portion and the parameter calculated by the riding comfort control portion are added, the weights are applied to these parameters according to the vehicle speed before addition. Accordingly, priority between the posture control of the vehicle and the riding comfort control of the vehicle can be arbitrarily changed according to the vehicle speed.

In order to achieve the second aspect, according to a tenth feature of the invention, in addition to the fourth feature, the addition portion applies the same weight to the two parameters before addition.

With the above configuration, when the parameter calculated by the posture control portion and the parameter calculated by the riding comfort control portion are added, the same weight is applied to the two parameters before addition. Accordingly, the calculation burden of the addition portion is reduced.

It is noted that, in the third to tenth features of the present invention, a sky hook riding comfort control section of an embodiment corresponds to the riding comfort control portion of the present invention, and a roll posture control section and a pitch posture control section of the embodiment correspond to the posture control portion of the present invention.

The above-mentioned aspect, other aspects, characteristics and advantages of the present invention will become apparent from the description of preferred embodiments which will be described in detail below by reference to the attached drawings.

DESCRIPTION OF THE PREFERRED EMBODIMENT

A first embodiment of the present invention will be described below with reference to FIGS. 1 to 9.

Figure 1:
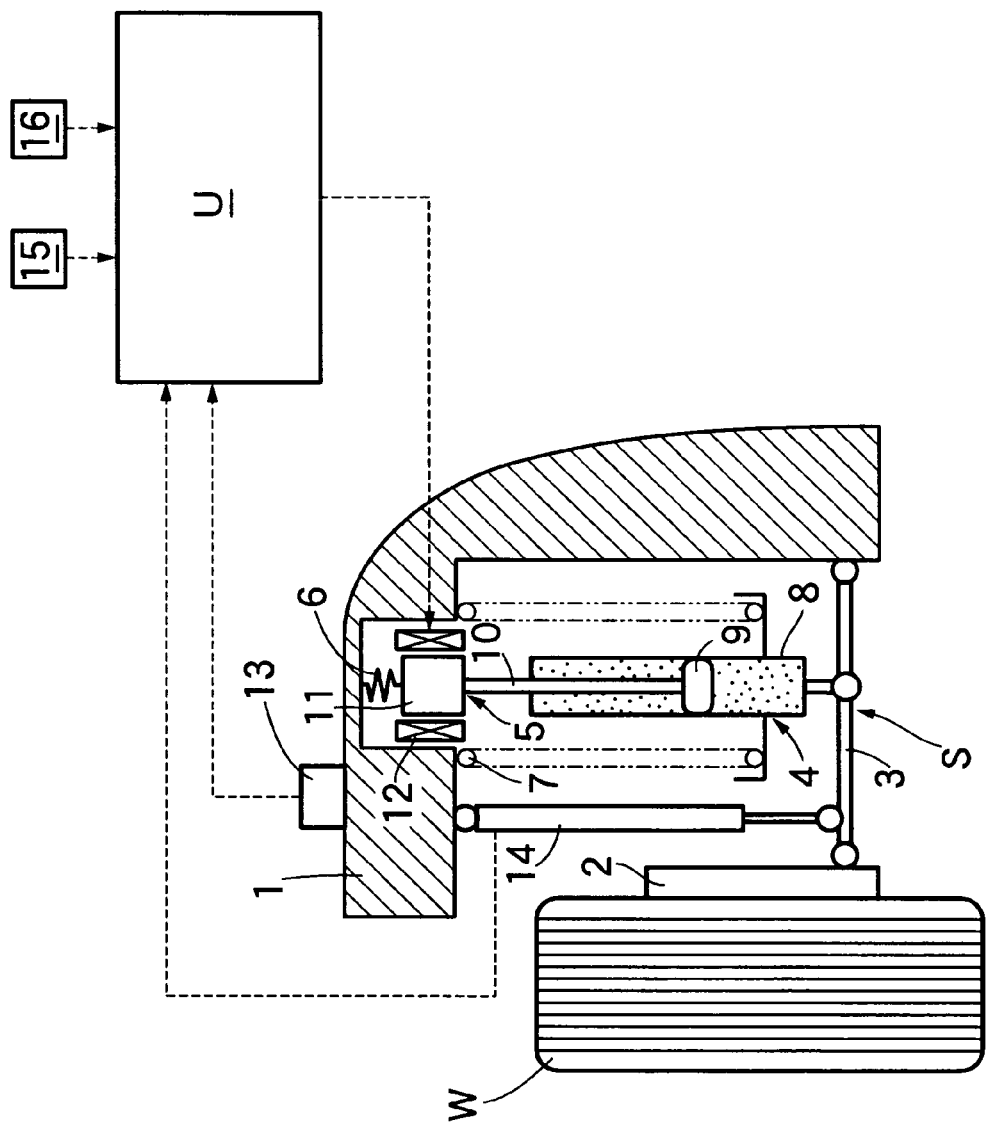
FIG. 1 is a front view of a vehicle suspension control system according to a first embodiment of the present invention.

As shown in FIG. 1, a suspension S, which suspends a wheel W of a four-wheel automobile, includes a suspension arm 3 vertically supporting a knuckle 2 in a movable manner on a vehicle body 1; a damper 4 disposed in series to connect the suspension arm 3 and the vehicle body 1; and a coil spring 7 connecting an actuator 5 and a damper mount rubber 6 to the suspension arm 3 and the vehicle body 1. The damper 4 includes a cylinder 8 having a lower end supported on the suspension arm 3; a piston 9 slidably fitted within the cylinder 8; and a piston rod 10 extending upward from the piston 9. The actuator 5 includes a core 11 connecting the upper end of the piston rod 10 to the lower end of the damper mount rubber 6; and a coil 12 disposed to surround the circumference of the core 11. The damper 4 is of a known hydraulic type wherein, when the piston 9 moves within the cylinder 8 filled with oil, a load (i.e., damping force) occurs according to the movement speed.

An electrical control unit U, which controls operation of the actuator 5, receives a signal from an above-spring acceleration sensor 13 which detects an above-spring acceleration; a signal from a damper displacement sensor 14 which detects a displacement of the damper 4; a signal from a lateral acceleration sensor 15 for detecting a lateral acceleration of the vehicle; and a signal from a longitudinal acceleration sensor 16 which detects a longitudinal acceleration of the vehicle. Based on the above-identified signals, the electrical control unit U controls an electrical current supplied to the damper 4, thereby arbitrarily changing the damping force.

Figure 2:
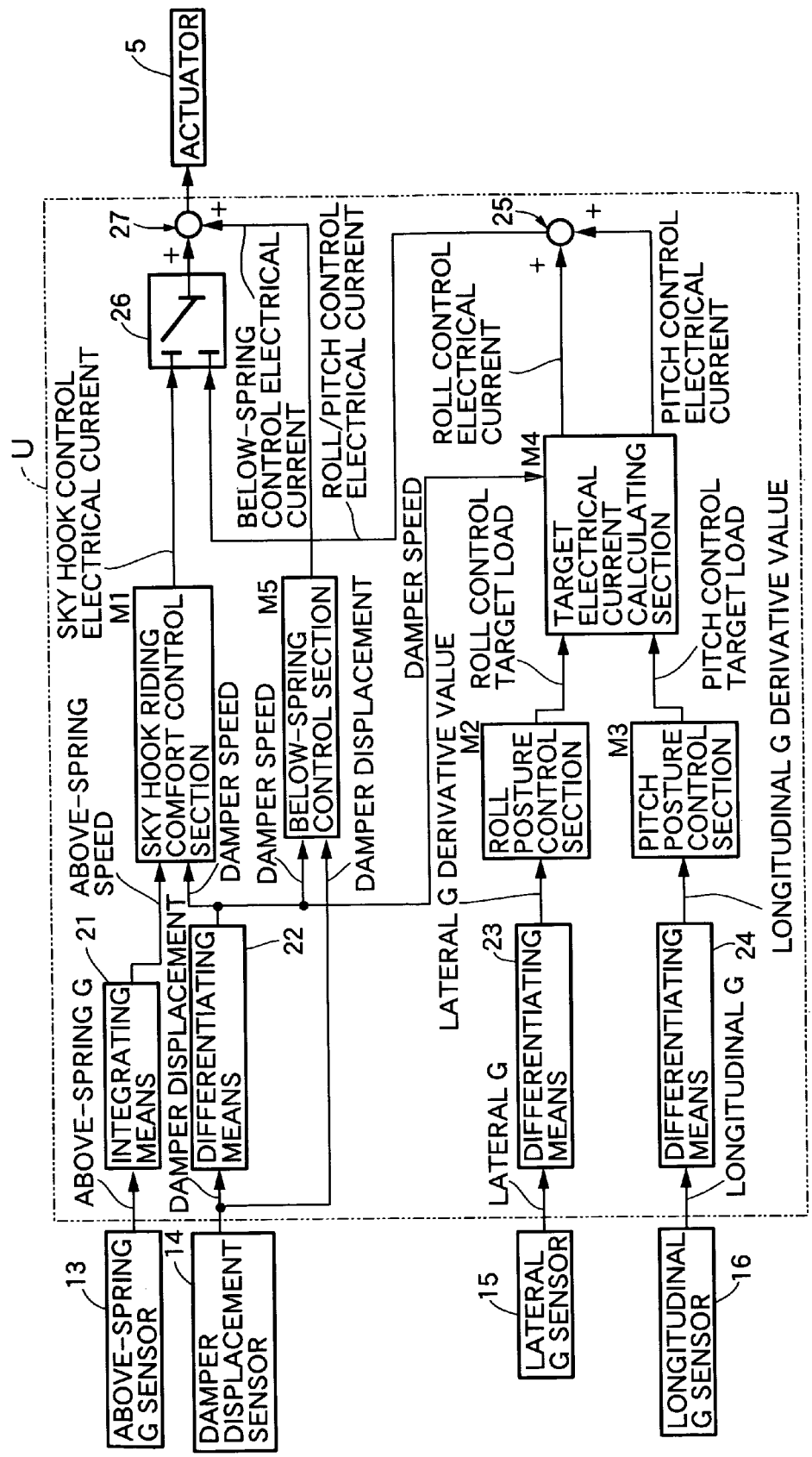
FIG. 2 is a block diagram of an actuator control system for changing the damping force of a damper.

As shown in FIG. 2, the electrical control unit U includes a sky hook riding comfort control section M1, a roll posture control section M2, a pitch posture control section M3, a target electrical current calculating section M4, and a below-spring control section M5. The above-spring acceleration output by the above-spring acceleration sensor 13 is integrated by integrating means 21 to be an above-spring vertical speed, and is then input into the sky hook riding comfort control section M1. The damper displacement output by the damper displacement sensor 14 is directly input to the below-spring control section M5 and, at the same time, is differentiated by differentiating means 22 to be a damper speed. The damper displacement is then input into the sky hook riding comfort control section M1 and the below-spring control section M5. The lateral acceleration output by the lateral acceleration sensor 15 is differentiated by differentiating means 23 to be a lateral acceleration derivative value and is then input into the roll posture control section M2. The longitudinal acceleration output by the longitudinal acceleration sensor 16 is differentiated by differentiating means 24 to be a longitudinal acceleration derivative value and is then input into the pitch posture control section M3.

After receiving the damper speed calculated by the differentiating means 22, a roll control target load (i.e., a target damping force generated by the damper 4 to perform a roll control) is output by the roll posture control section M2; a pitch control target load (i.e., a target damping force generated by the damper 4 to perform a pitch control) is output by the pitch posture control section M3; and the target electrical current calculating section M4 outputs a roll control electrical current and a pitch control electrical current that is supplied to the actuator 5 of the damper 4. The roll control electrical current and the pitch control electrical current are added by addition means 25 to be a roll/pitch control electrical current. This roll/pitch control electrical current is then input into a high select means 26. After receiving a sky hook control electrical current (i.e., a target electrical current for performing a sky hook control) from the sky hook riding comfort control section M1 in addition to the roll/pitch control electrical current, the high select means 26 selects the larger of the roll/pitch control electrical current and the sky hook control electrical current. Subsequently, a high select value output by the high select means 26 and a below-spring control electrical current (i.e., a target electrical current for performing a below-spring control) output by the below-spring control section M5 are added by the addition means 27. Operation of the actuator 5 is controlled based on this added value.

Figure 3:
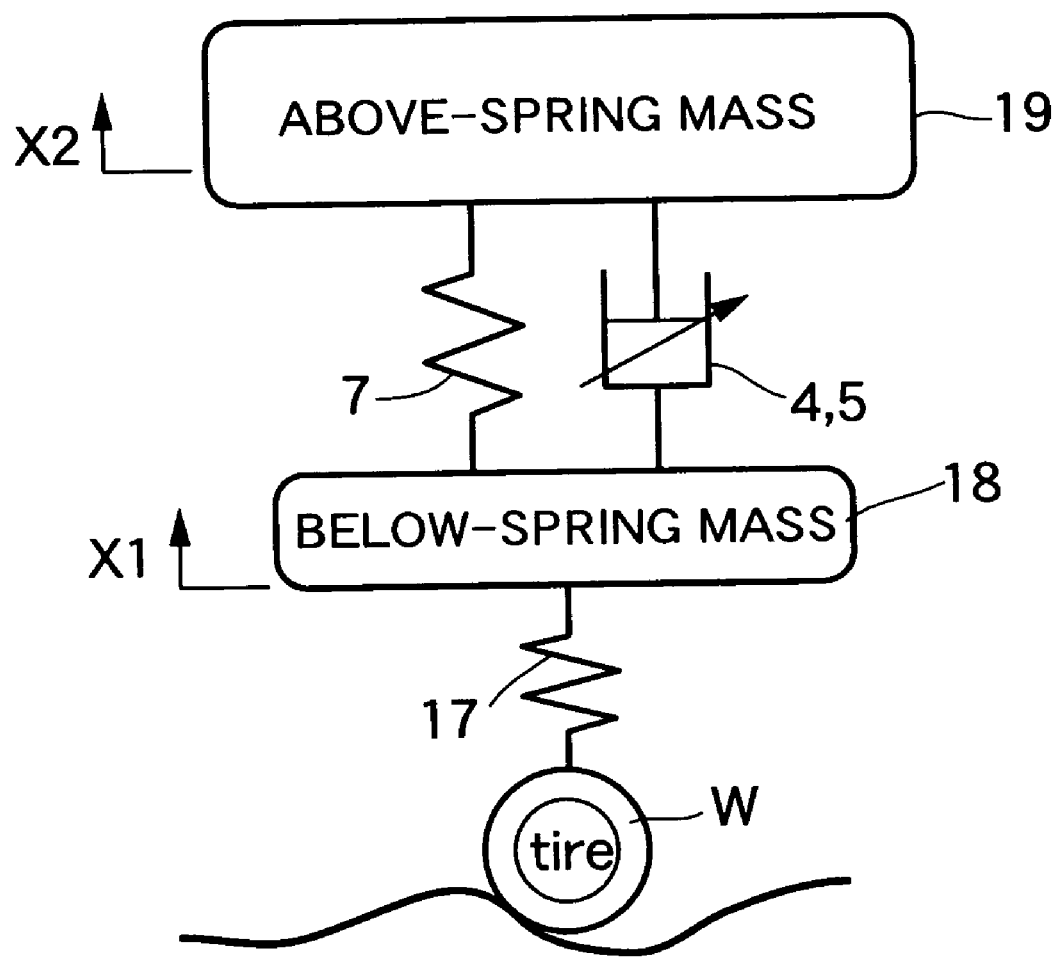
FIG. 3 is a schematic diagram of the suspension.

The function of the sky hook riding comfort control section M1 will now be described with reference to FIGS. 3 and 4.

As apparent from the schematic diagram of the suspensions shown in FIG. 3, a below-spring mass 18 is connected to the road surface via a virtual spring 17 of the tire. An above-spring mass 19 is connected to the below-spring mass 18 via the damper 4, actuator 5 and coil spring 7. The damping force of the damper 4 is changed by the actuator 5. A rate of change $dX2/dt$ of a displacement $X2$ of the above-spring mass 19 corresponds to the above-spring vertical speed output by the integrating means 21 shown in FIG. 2. A rate of change $d(X2-X1)/dt$ of the difference between the displacement $X2$ of the above-spring mass 19 and the displacement X1 of the below-spring mass 18 corresponds to the damper speed output by the differentiating means 22 shown in FIG. 2. When $dX2/dt \times d(X2-X1)/dt > 0$, i.e., when the above-spring vertical speed and the damper speed have the same direction (the same sign), then the actuator 5 of the damper 4 is controlled to increase the damping force. On the other hand, when $dX2/dt \times d(X2-X1)/dt \leqq 0$, i.e., when the above-spring vertical speed and the damper speed have opposite directions (opposite signs), the actuator 5 of the damper 4 is controlled to decrease the damping force.

Figure 4:
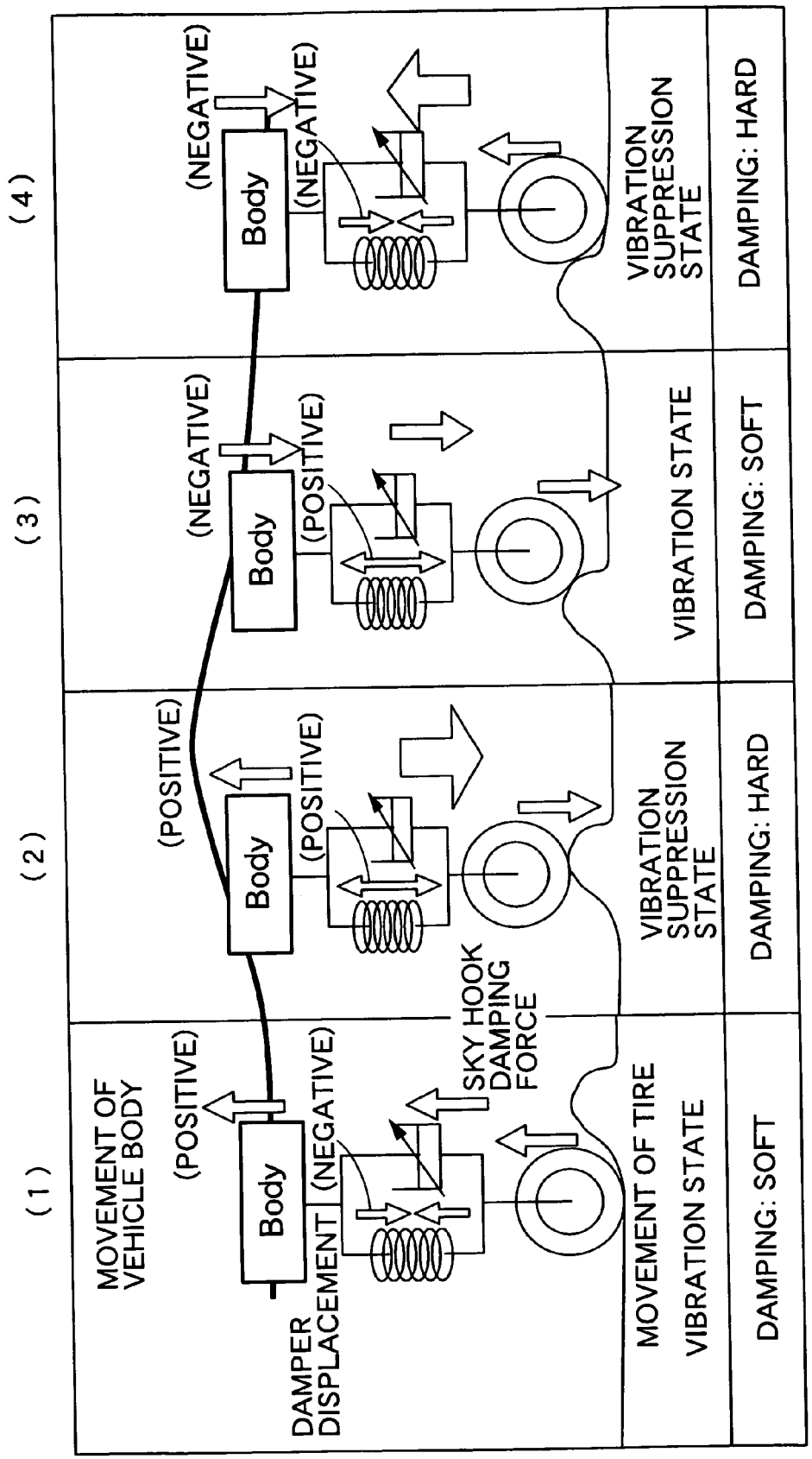
FIG. 4 is an explanatory diagram of sky hook control.

Therefore, assuming that a wheel W passes over a protrusion of the road surface, as shown in FIG. 4, while the wheel moves upward along the first half of the protrusion as shown in (1), the vehicle body 1 moves upward, the above-spring vertical speed (dX2/dt) assumes a positive value, and the damper 4 is compressed, wherein the damper speed d(X2–X1)/dt has a negative value. That is, the two speeds have opposite signs wherein the actuator 5 of the damper 4 is controlled to decrease the damping force in a direction of compression.

Immediately after the wheel W passes over the peak of the protrusion, as shown in (2), the vehicle body 1 continues to move upward due to inertia; the above-spring vertical speed (dX2/dt) assumes a positive value; and the damper 4 is expanded by the ascending vehicle body 1, wherein the damper speed d(X2–X1)/dt assumes a positive value. That is, the two speeds have the same sign wherein the actuator 5 of the damper 4 is controlled to increase the damping force in a direction of expansion.

While the wheel W moves downward along the second half of the protrusion, as shown in (3), the vehicle body 1 moves downward; the above-spring vertical speed (dX2/dt) assumes a negative value; and the wheel W moves downward faster than the vehicle body 1 to expand the damper 4, wherein the damper speed d(X2–X1)/dt assumes a positive value. That is, the two speeds have opposite signs wherein the actuator 5 of the damper 4 is controlled to decrease the damping force in a direction of expansion.

Immediately after the wheel W completely passes over the protrusion, as shown in (4), the wheel 1 continues to move downward due to inertia; the above-spring vertical speed (dX2/dt) assumes a negative value; and the wheel W ceases moving downward to compress the damper 4, wherein the damper speed d(X2–X1)/dt assumes a negative value. That is, the two speeds have the same sign so that the actuator 5 of the damper 4 is controlled to increase the damping force in a direction of compression.

Thus, in improving the riding comfort of the vehicle by performing such sky hook control, it is possible to reduce the switch-over noise and the uncomfortable feeling by calculating the damping force (i.e., the sky hook control electrical current) based on (proportionality constant)×(above-spring vertical speed) in regions shown in (2) and (4) of FIG. 4 wherein the damping force of the actuator 5 of the damper 4 is increased.

The operation of the roll posture control section M2 and the target electrical current calculating section M4 will now be described with reference to FIGS. 5 to 8.

Figure 5:
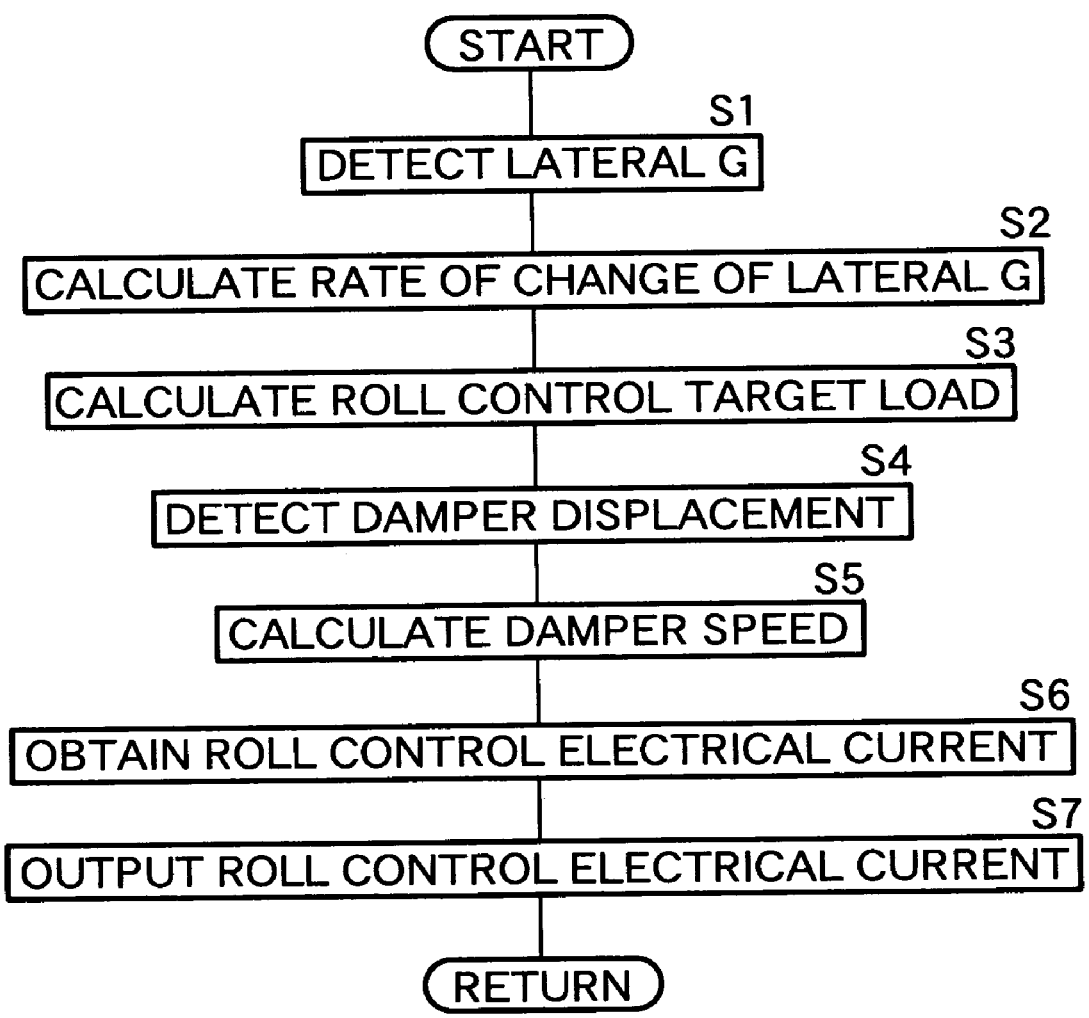
FIG. 5 is a flowchart showing an operation of roll posture control.
Figure 6:
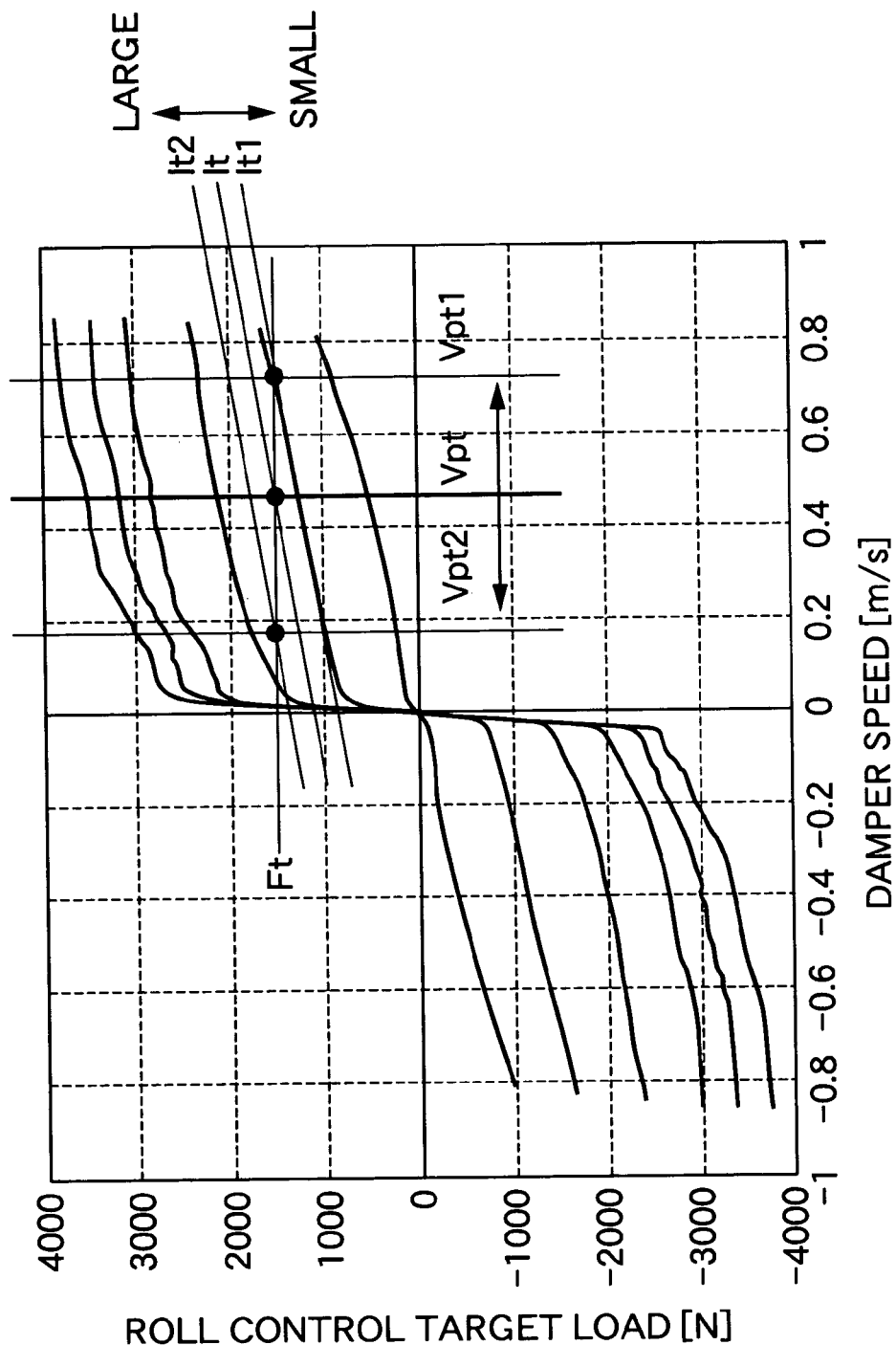
FIG. 6 is a map from which a target electrical current of the actuator is obtained.

Referring to a flowchart of FIG. 5, the lateral acceleration is detected by the lateral acceleration sensor 15 in step S1. In step S2, the lateral acceleration is differentiated by the differentiating means 23 to calculate the rate of change of the lateral acceleration. Then, in step S3, the roll control target load is calculated based on (proportionality constant)×(lateral acceleration derivative value) in the roll posture control section M2. Subsequently, in step S4, the damper displacement is detected by the damper displacement sensor 14. In step S5, the damper displacement is differentiated by the differentiating means 22 to calculate the damper speed. Then, in step S6, the target electrical current calculating section M4, which receives the roll control target load and the damper speed, obtains the roll control electrical current from a map (FIG. 6). The resulting control electrical current is output to the addition means 25 in step S7.

FIG. 6 illustrates the map from which the roll control electrical current is obtained based on the roll control target and the damper speed. The roll control electrical current basically has a proportional relationship with the roll control target load in the axis of ordinate. However, the roll control electrical current is corrected by the damper speed. For example, when the roll control target load is Ft, if the damper speed is Vpt, then the roll control electrical current is It. If the damper speed increases from Vpt to Vpt1, then the roll control electrical current decreases from It to It1. On the other hand, if the damper speed decreases from Vpt to Vpt2, then the roll control electrical current increases from It to It2.

Figure 7:
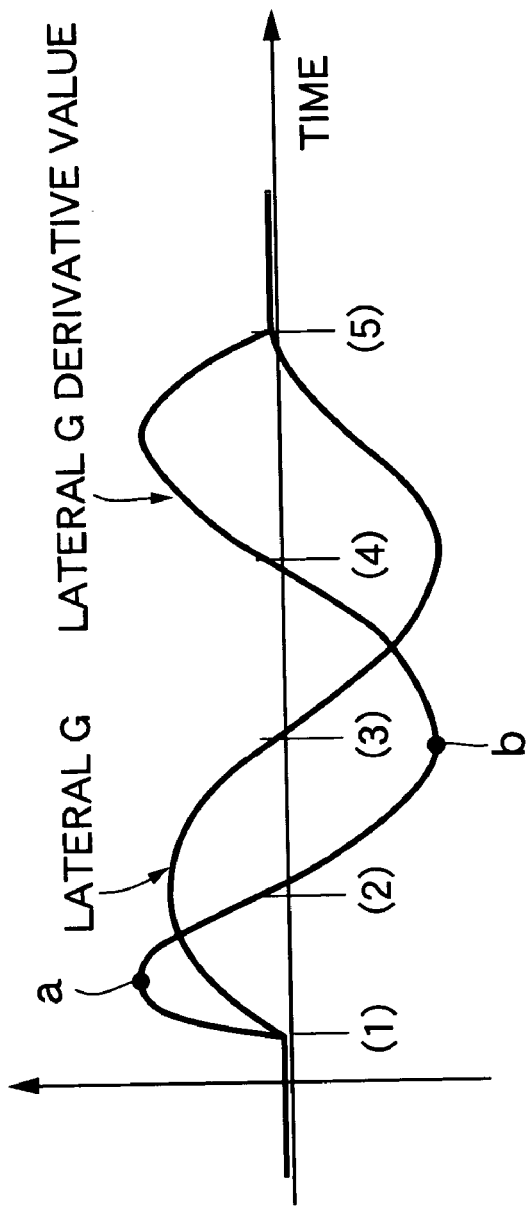
FIG. 7 is a graph showing a lateral acceleration and a lateral acceleration derivative value when a lane change is performed.
Figure 8:
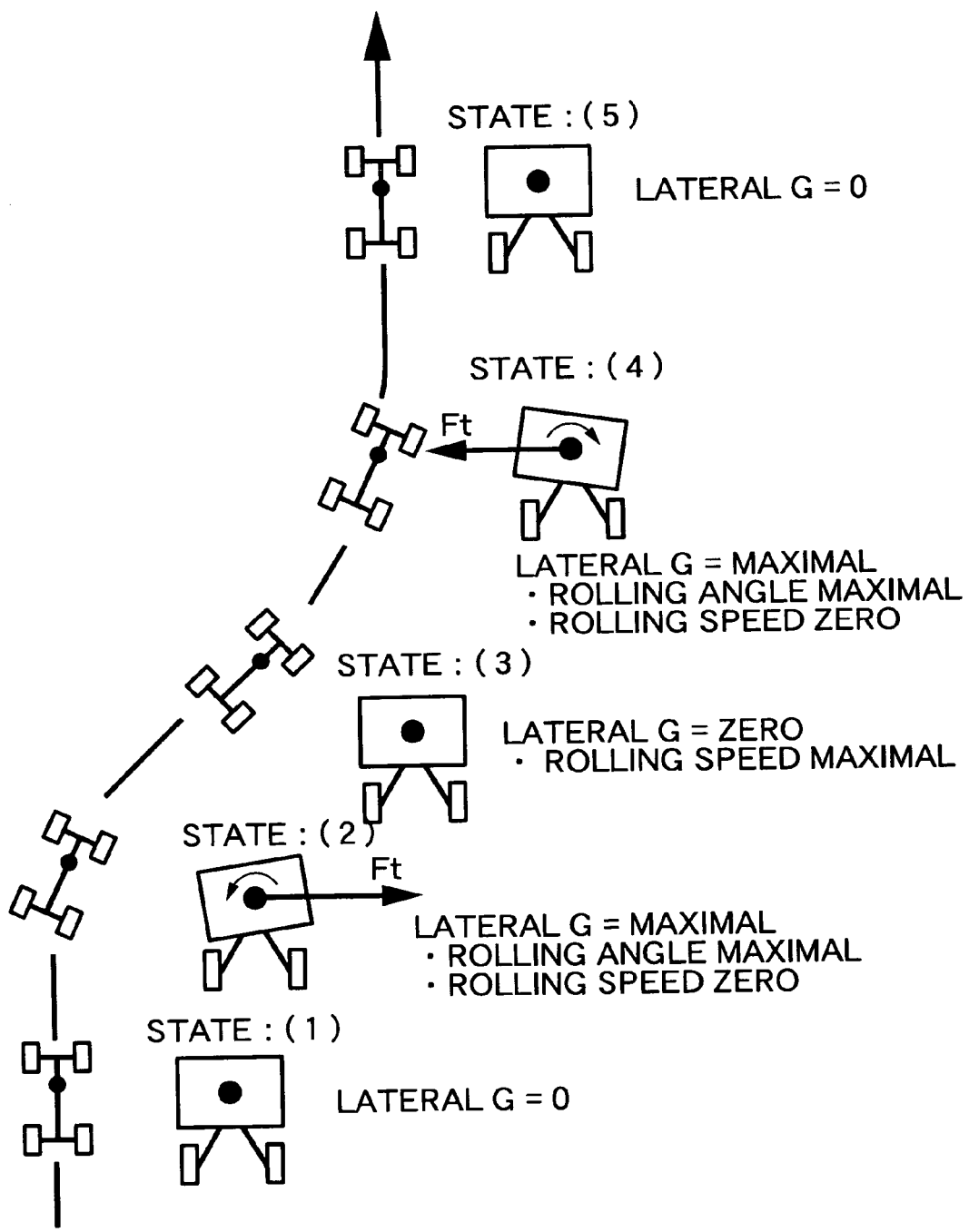
FIG. 8 is a diagram illustrating vehicle movement when a lane change is performed.

FIG. 7 shows the lateral acceleration and the lateral acceleration derivative value obtained by differentiating the lateral acceleration when the vehicle performs a lane change from a left lane to a right lane. In the drawing, reference numerals (1) to (5) on the time axis correspond to reference numerals (1) to (5) indicating a movement of the vehicle performing a lane change as shown in FIG. 8.

In (1), (3) and (5), the lateral acceleration is zero and the vehicle body 1 does not roll. In (2), the vehicle is turning right and the vehicle body 1 rolls to the left side by centrifugal force. In (4), the vehicle is turning left and the vehicle body 1 rolls to the right side by centrifugal force. At this time, the roll control target load Ft is generated in the damper 4 to suppress the roll of the vehicle body 1 outward in a right or left turning direction to stabilize the posture of the vehicle.

In this case, when the roll control target load Ft of the damper 4 is determined based on the lateral acceleration to control the rolling angle of the vehicle body 1, since the lateral acceleration changes with substantially the same phase as the rolling angle, a delay may occur in controlling the damping force of the damper 4. Referring to the graph of FIG. 7, the absolute value of the lateral acceleration derivative value reaches a maximum value at a point a prior to a timing (2) when the leftward lateral acceleration reaches a maximum value; the absolute value of the lateral acceleration derivative value reaches a maximum value at point b prior to a timing (4) when the rightward lateral acceleration reaches a maximum value. Accordingly, due to the fact that the phase of change of the lateral acceleration derivative value precedes that of the lateral acceleration, and by setting the roll control target load Ft of the damper 4 in proportion to the lateral acceleration derivative value, it is possible to control the damping force of the damper 4 to further stabilize the posture of the vehicle without delay, thereby achieving, simultaneously, an accurate posture control and a satisfactory riding comfort.

Additionally, when the target electrical current calculating section M4 obtains the roll control electrical current from the roll control target load on the map, the roll control electrical current is corrected by the damper speed. Consequently, even when there is a large input due to unevenness of the road surface, the roll control target load is properly set to avoid deterioration of riding comfort.

To suppress a noseup motion at the time of sudden acceleration or a nosedown motion at the time of sudden braking, the pitch posture control section M3 calculates the pitch control target load from the longitudinal acceleration derivative value obtained in the differentiating means 24 by differentiating the longitudinal acceleration detected by the longitudinal acceleration sensor 16, and, when the target electrical current calculating section M4 obtains the pitch control electrical current from the pitch control target load on the map, the pitch control electrical current is corrected based on the damper speed.

The roll control electrical current and the pitch control electrical current output by the target electrical current calculating section M4 are added by the addition means 25. Then, the added value (i.e., the roll/pitch control electrical current) is supplied to the high select means 26, such that a comparison is performed between the roll/pitch control electrical current and the sky hook control electrical current, and wherein the larger of the two currents is output to the addition means 27. In the addition means 27, the electrical current is added to the below-spring control electrical current output by the below-spring control section M5. Based on this added value, the damping force of the actuator 5 of the damper 4 is controlled.

As described above, the larger of the roll/pitch control electrical current and the sky hook control electrical current is selected and output to the actuator 5 by the high select means 26. Consequently, the roll/pitch control electrical current is switched to the sky hook control electrical current when the sky hook control electrical current increases and exceeds the roll/pitch control electrical current while the roll/pitch control electrical current is selected by the high select means 26. On the other hand, the sky hook control electrical current is switched to the roll/pitch control electrical current when the roll/pitch control electrical current increases and exceeds the sky hook control electrical current while the sky hook control electrical current is selected by the high select means 26. In either case, the high select electrical current output by the high select means 26 does not suddenly change in a discontinuous manner at the time of switch-over, thus preventing driving discomfort from operation of the actuator 5.

Figure 9:
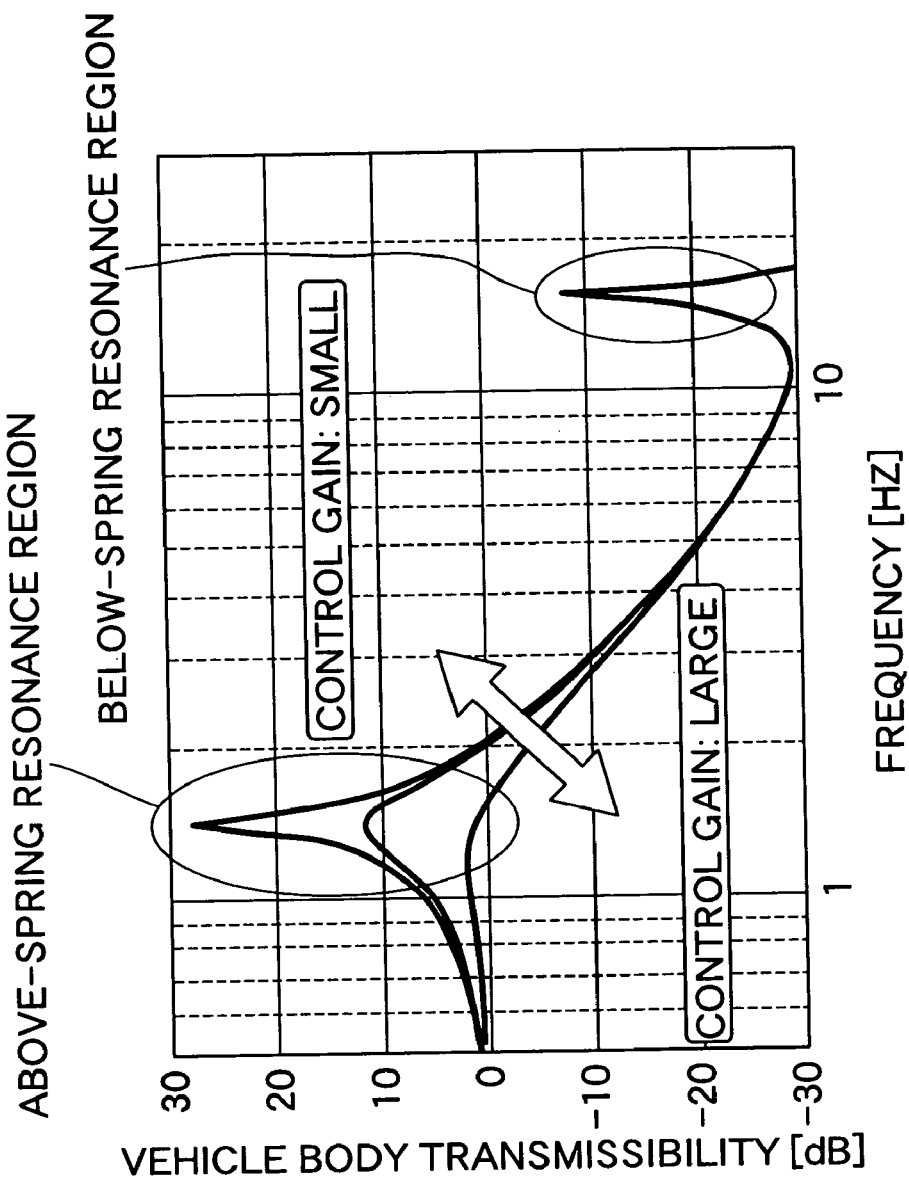
FIG. 9 is a graph showing vibration transmissibility in the sky hook control.

In the sky hook control, as shown in FIG. 9, even when the control gain is changed, vibration transmissibility changes only in the vicinity of 1 Hz, which is the above-spring resonance frequency. Thus, there is a problem that vibration transmissibility cannot be controlled in the vicinity of 10 Hz, which is the below-spring resonance frequency.

The below-spring control section M5 is provided to solve this problem. Paying attention to the product of the damper speed and the damper displacement as an index for comprehending and controlling a vibration in the below-spring resonance region, the below-spring control electrical current is calculated from (proportionality constant)×(damper speed)×(damper displacement), and is then added to the high select electrical current output by the high select means 26 in the addition means 27. As a result, when the damper speed and the damper displacement are particularly large, vibrations in the below-spring resonance region in the vicinity of 10 Hz are independently suppressed from the sky hook control.

Figure 10:
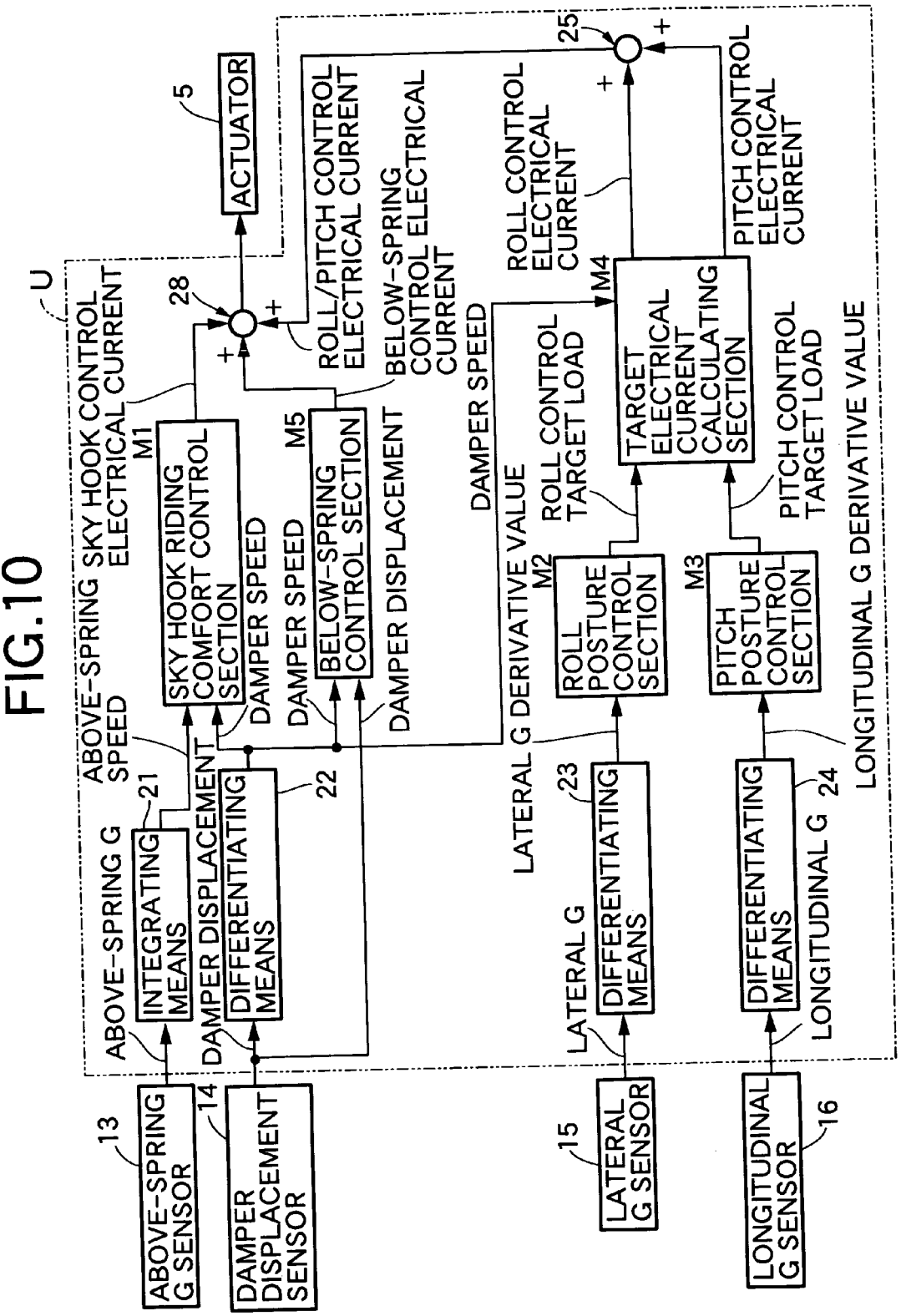
FIG. 10 is a block diagram of an actuator control system for changing the damping force of a damper according to a second embodiment.

A second embodiment of the present invention will now be described with reference to FIG. 10.

In the first embodiment shown in FIG. 2, the sky hook control electrical current output by the sky hook riding comfort control section M1 and the roll/pitch control electrical current output by the target electrical current calculating section M4 are input to the high select means 26, and the larger of the two currents is selected and output. In the second embodiment, however, an addition means 28 is provided instead of the high select means 26. In this addition means 28, the sky hook control electrical current, the roll/pitch control electrical current, and the below-spring control electrical current are added.

Also, with this second embodiment, by constantly adding together the sky hook control electrical current and the roll/pitch control electrical current, a sudden change of the damping force of the damper 4 due to the switch-over between the sky hook control and the roll/pitch control is avoided, thus improving riding comfort.

Particularly, if weighting factors are multiplied together with the sky hook control electrical current output by the sky hook riding comfort control section M1 and the roll/pitch control electrical current output by the target electrical current calculating section M4, and the multiplied values are added together by the addition means 28, then priority between the riding comfort control and the posture control of the vehicle can arbitrarily be changed according to the vehicle speed. Also, if the sky hook control electrical current output by the sky hook riding comfort control section M1 and the roll/pitch control electrical current output by the target electrical current calculating section M4 are added without performing weighting, the calculation load of the addition means 28 is reduced.

Figure 11:
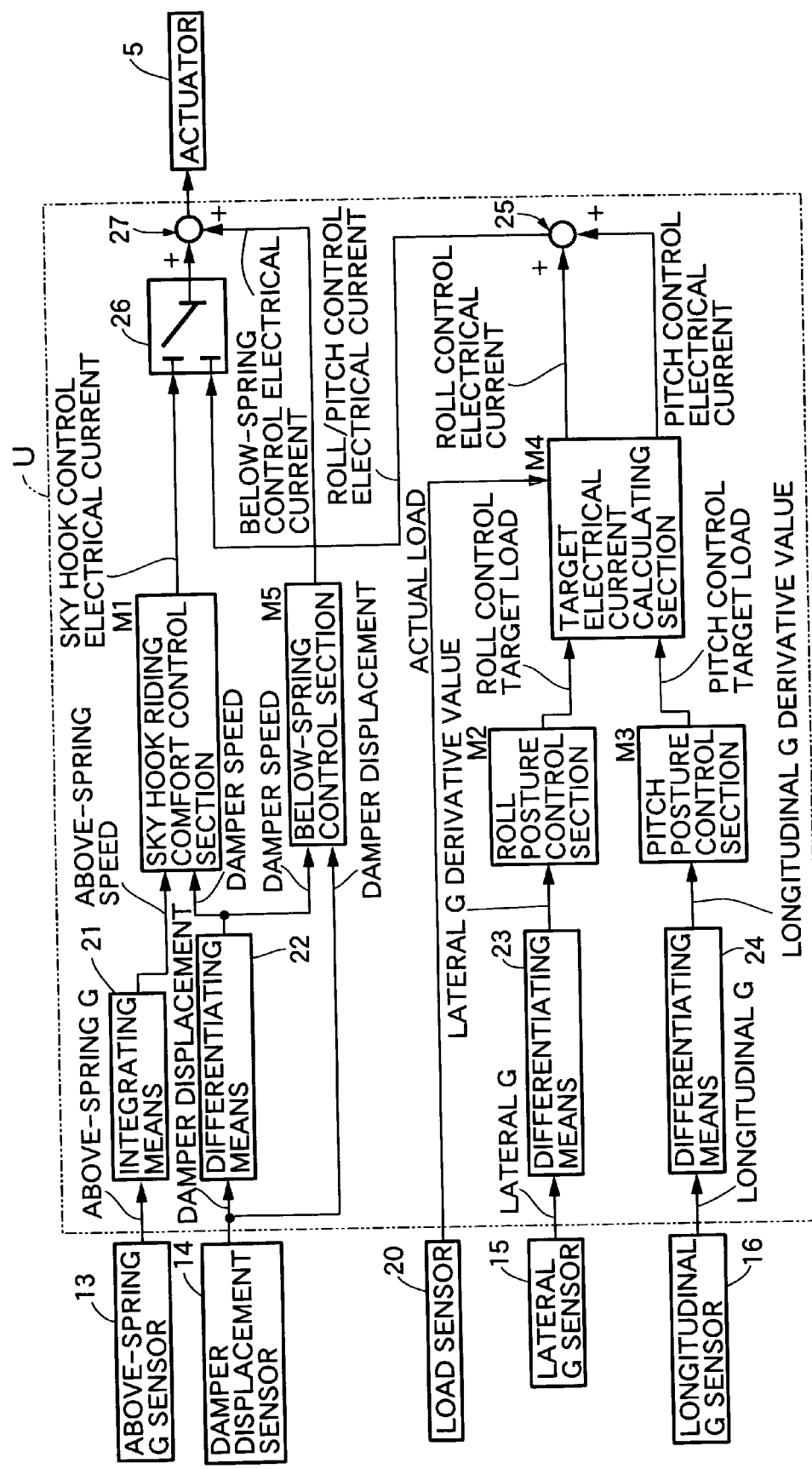
FIG. 11 is a block diagram of an actuator control system for changing the damping force of a damper according to a third embodiment.

A third embodiment of the present invention will now be described with reference to FIG. 11.

In the first embodiment, shown in FIG. 2, the target electrical current calculating means M4 obtains the roll control electrical current (or the pitch control electrical current) from a map by using, as parameters, the damper speed output by the differentiating means 22 and the roll control target load (or the pitch control target load outputted by the pitch posture control section M3). In the third embodiment, however, a load sensor 20, for detecting the actual load input to the damper 4, is disposed between the damper 4 and the vehicle body, and an output of the load sensor 20 is input into the target electrical current calculating means M4. The target electrical current calculating means M4 calculates the roll control electrical current (or the pitch control electrical current) so that the actual load detected by the load sensor 20 and the roll control target load (or the pitch control target load) are identical.

With the third embodiment, even when a large input is applied to the damper 4 due to unevenness of the road surface, the increase of the actual load reduces the roll control electrical current or the pitch control electrical current to decrease the damping force of the damper 4. Consequently, a proper posture control is performed without deteriorating the riding comfort performance.

Although the present invention has been described with reference to specific embodiments, various modifications can be made thereto without departing from the scope and spirit of the present invention.

For example, the roll posture control section M2 and the pitch posture control section M3 are provided to perform both roll posture control and pitch posture control. However, either one of the controls may be performed alone.

Also, the longitudinal acceleration is detected by the longitudinal acceleration sensor 16. However, the longitudinal acceleration may be calculated by differentiating the vehicle speed detected by a vehicle speed sensor.

Also, an observer for monitoring the damper displacement may be provided to calculate the damper speed based on the damper displacement detected by the damper displacement sensor 14.

What is claimed is:

1. A suspension control system comprising:
a suspension, which suspends a wheel on a vehicle body;
an actuator, which changes a damping force of a damper of the suspension;
an acceleration sensor, which detects at least one of a lateral acceleration and a longitudinal acceleration of a vehicle;
acceleration derivative value calculating means, which differentiates the acceleration detected by the acceleration sensor to calculate an acceleration derivative value;

target electrical current calculating means, which calculates, based on the acceleration derivative value, a target electrical current to be supplied to the actuator;
a damper displacement sensor, which detects a damper displacement; and
damper speed calculating means, which calculates a damper speed based on the damper displacement detected by the damper displacement sensor,
wherein the target electrical current calculating means corrects the target electrical current based on the damper speed.

2. A suspension control system comprising:
a suspension, which suspends a wheel on a vehicle body;
an actuator, which changes a damping force of a damper of the suspension;
an acceleration sensor, which detects at least one of a lateral acceleration and a longitudinal acceleration of a vehicle;
acceleration derivative value calculating means, which differentiates the acceleration detected by the acceleration sensor to calculate an acceleration derivative value;
target load calculating means, which calculates, based on the acceleration derivative value, a target load to be generated by the actuator;
target electrical current calculating means, which calculates, based on the target load, a target electrical current to be supplied to the actuator; and
a load sensor disposed between the damper and the vehicle body to detect an actual load input from the damper to the vehicle body,
wherein the target electrical current calculating means sets the target electrical current to be supplied to the actuator so that the actual load detected by the load sensor is identical to the target load.

3. A suspension control system comprising:
a suspension, which suspends a wheel on a vehicle body;
an actuator, which changes a damping force of a damper of the suspension;
a posture control portion, which calculates a parameter for controlling a posture of a vehicle including at least one of a roll and a pitch;
a riding comfort control portion, which calculates a parameter for suppressing a vibration transmitted from a road surface to control riding comfort of the vehicle; and
a high select portion, which outputs a larger one of the parameter calculated by the posture control portion and the parameter calculated by the riding comfort control portion to control the damping force of the damper.

4. A suspension control system comprising:
a suspension, which suspends a wheel on a vehicle body;
an actuator, which changes a damping force of a damper of the suspension;
a posture control portion, which calculates a parameter for controlling a posture of a vehicle including at least one of a roll and a pitch;
a riding comfort control portion, which calculates a parameter for suppressing a vibration transmitted from a road surface to control riding comfort of the vehicle; and
an addition portion, which adds together the parameter calculated by the posture control portion and the parameter calculated by the riding comfort control portion to control the damping force of the damper.

5. The suspension control system according to claim 3, wherein the posture control portion is a roll posture control section which calculates, based on at least a lateral acceleration derivative value, the parameter for controlling the posture of the vehicle, and wherein the riding comfort control portion is a sky hook riding comfort control section which calculates, based on at least an above-spring vertical speed, the parameter for controlling the riding comfort of the vehicle.

6. The suspension control system according to claim 4, wherein the posture control portion is a roll posture control section which calculates, based on at least a lateral acceleration derivative value, the parameter for controlling the posture of the vehicle, and wherein the riding comfort control portion is a sky hook riding comfort control section which calculates, based on at least an above-spring vertical speed, the parameter for controlling the riding comfort of the vehicle.

7. The suspension control system according to claim 3, wherein the posture control portion is a pitch posture control section which calculates, based on at least a longitudinal acceleration derivative value, the parameter for controlling the posture of the vehicle, and wherein the riding comfort control portion is a sky hook riding comfort control section which calculates, based on at least an above-spring vertical speed, the parameter for controlling the riding comfort of the vehicle.

8. The suspension control system according to claim 4, wherein the posture control portion is a pitch posture control section which calculates, based on at least a longitudinal acceleration derivative value, the parameter for controlling the posture of the vehicle, and wherein the riding comfort control portion is a sky hook riding comfort control section which calculates, based on at least an above-spring vertical speed, the parameter for controlling the riding comfort of the vehicle.

9. The suspension control system according to claim 4, wherein the addition portion applies weights to the two parameters according to the vehicle speed before addition.

10. The suspension control system according to claim 4, wherein the addition portion applies the same weight to the two parameters before addition.

* * * * *